No. 783,239.

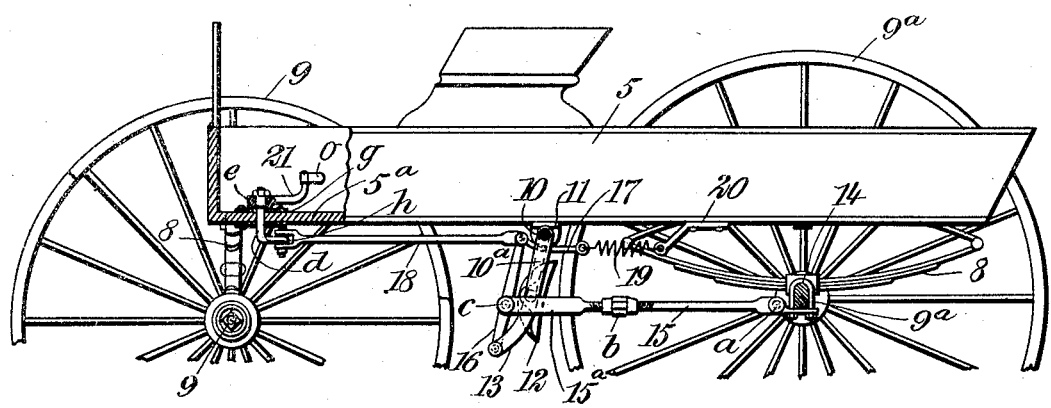
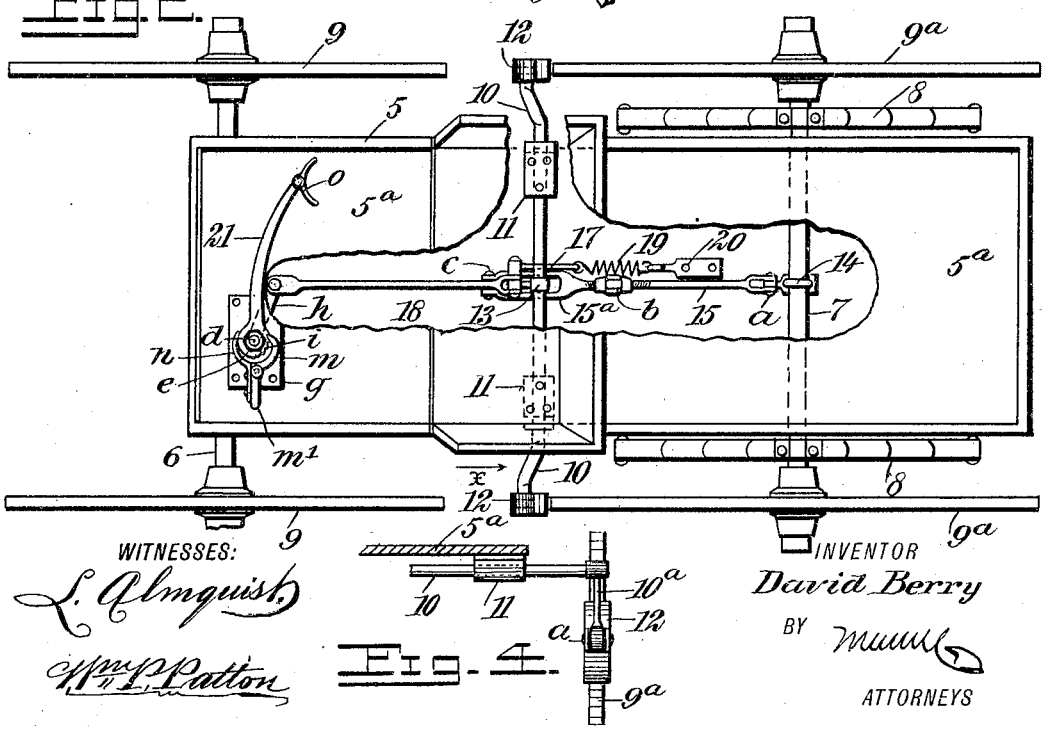

Patented February 21, 1905.

UNITED STATES PATENT OFFICE.

DAVID BERRY, OF FISHROCK, CALIFORNIA.

VEHICLE-BRAKE.

SPECIFICATION forming part of Letters Patent No. 783,239, dated February 21, 1905.

Application filed August 27, 1904. Serial No. 222,376.

*To all whom it may concern:*

Be it known that I, DAVID BERRY, a citizen of Switzerland, and a resident of Fishrock, in the county of Mendocino and State of California, have invented a new and Improved Vehicle-Brake, of which the following is a full, clear, and exact description.

The object of this invention is to provide a brake for vehicles which will be very powerful, be easily operated by foot-power, and capable of release by changing the pressure of the feet of the operator.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a partly-sectional side view of the improved brake mounted upon a vehicle, the brake being in released adjustment. Fig. 2 is a plan view of the vehicle and of the brake mounted thereon in released adjustment, a portion of the vehicle-body being removed to show portions of the brake that are located below the body. Fig. 3 is a fragmentary partly-sectional side view of the vehicle and a partly-sectional side view of the brake mounted thereupon and adjusted to brake a wheel of the vehicle, and Fig. 4 is a detail view of the improved brake seen opposite the arrow $x$ in Fig. 2.

In the drawings, which show the construction and application of the invention, 5 indicates the box-body of a vehicle mounted upon a front axle 6 and rear axle 7 by springs 8, seated upon the axles, the latter receiving upon their end spindles wheels 9 $9^a$, that rotate thereon as usual.

A brake-shaft 10 is held to rock transversely on the lower side of the wagon-body 5 by two bracket-boxes 11, secured thereto at points which locate the shaft near the rims of the rear wheels $9^a$. Fixed upon the ends of the shaft 10 are the upper ends of two similar arms $10^a$, lower ends of which are loosely secured upon respective brake-blocks 12, the concave faces of which are disposed opposite but not in contact with the peripheries of the wheels $9^a$ when the brake mechanism is in released adjustment.

Near the longitudinal center of the brake-shaft 10 a rock-arm 13 is affixed by one end and thence extends downward, the lower portion being preferably curved edgewise and forward, as shown in Figs. 1 and 3.

Upon the rear axle 7 a clip-band 14 is clamped near the longitudinal center of said axle, and upon the clamping-plate of said clip-band that at one end extends forward the rear end of a connecting-rod 15 is pivoted, as is shown at $a$ in the drawings. A turnbuckle $b$ is introduced in the connecting-rod 15, which engages threaded bisected members thereof and by rotatable adjustment controls the length of said rod. The forward end portion $15^a$ of the connecting-rod 15 is forked, and through said fork the lower portion of the rock-arm 13 is passed downward. Between the ends of the forked members on the connecting-rod 15 an upwardly and downwardly projecting rock-arm 16 is pivoted between its ends, as shown at $c$, the lower ends of the rock-arms 13 and 16 that lap together laterally being pivoted where they lap, as is indicated in Figs. 1 and 2.

Upon the upper end of the double-ended rock-arm 16 ends of a short link-rod 17 and a long link-bar 18 are lapped and pivoted, the rear end of the rod 18 being preferably forked to facilitate such a connection, as is shown in Fig. 2. The short link-rod 17 extends rearward and at the rear end is connected to the front end of a contractile spring 19, which at its remaining end is coupled with a bracket-plate 20, that is attached upon the lower side of the bottom of the body 5.

A horizontal treadle-lever 21 is held to rock above and near the upper side of the floor $5^a$ of the vehicle-body 5 by a vertical stub-shaft $d$, that passes through and is secured to a circular-edged hub $e$, formed on an end of said treadle-lever and that seats upon a wear-plate $g$, that seats upon and is secured to the floor $5^a$. The wear-plate and shaft $d$ are at one side of the forwardly-trending elongated link-bar 18, and from the lower end of the shaft $d$ extends an arm $h$, that is pivoted upon the forward end of said link-bar.

A plurality of ratchet-teeth $i$ are formed in the circular edge of the hub $e$ at the rear side of the latter, and a curved dog or pawl $m$ is pivoted upon the upper side of the wear-plate $g$, having its toe-spring pressed into engagement between the teeth $i$ by a plate-spring $n$, that is secured by one end upon a lateral lug $m'$, formed on the curved pawl $m$, the resilient body of said spring having contact with the hub $e$ at a point opposite from the teeth $i$. The treadle-lever 21 extends away from the lug $m'$ of a proper length for effective service and may have a foot-hold piece $o$ on its free end that may be pressed by the right foot of the driver of a team drawing the vehicle.

It will be seen that if the pawl $m$ is released from engagement between the ratchet-teeth $i$ the contractile force of the coiled spring 19 will pull upon the short link-rod 17 and long link-bar 18, which will pull upon the outer end of the arm $h$ and rock the free end of the treadle-lever 21 rearward. This pull on the short link-rod 17 at the same time rocks the upper end of the double-ended rock-arm 16 rearward and its lower end forward, which will correspondingly rock forward the lower end of the rock-arm 13 and turn the brake-shaft 10 in such a direction as will rock the brake-blocks 12 away from the peripheries of the rear wheels $9^a$, this being the normal condition of the brake mechanism.

When the brake is to be applied, the operator presses forward upon the free end of the treadle-lever 21, thus rocking the arm $h$ forward and pulling upon the long link-bar 18, so as to rock the upper end of the double-ended rock-arm 16 forward and push its lower end rearward. This will rock the lower end of the rock-arm 13 rearward and turn the brake-shaft 10 in direction of the curved arrow in Fig. 3, thus enforcing contact of the brake-blocks 12 upon the rims of the wheels $9^a$. When the treadle-lever 21 is pushed by foot-pressure forwardly, the pawl $m$ will ride with its toe over the ratchet-teeth $i$, and said toe will drop between two of said teeth when the brake-blocks 12 have enforced contact with the peripheries of the rear wheels $9^a$, thus holding the brake-blocks in contact with said wheels until the brake is released by foot-pressure on the lug $m'$, as before explained.

By provision of the turnbuckle connection $b$ between members of the connecting-rod 15 the pressure of the brake-blocks 12 may be increased at any time this is desired and also affords means for compensating for wear on faces of the brake-blocks.

The improved brake may be applied upon heavy or light wheeled vehicles of all kinds which will permit the placing of a treadle-lever 21 upon the vehicle-body in front of the seat for the driver or other person who is to operate the brake and allow a connection of the treadle-lever with the brake-shaft as is set forth.

Having thus described my invention, I claim as new and desire to secure by Letters Patent—

1. A vehicle-brake embodying a rockable brake-shaft on the vehicle-body, brake-blocks carried on the ends of said shaft for contact with the rear vehicle-wheels, a rock-arm pendent from the brake-shaft, a rock-arm pivoted on a support between its ends and pivoted at its lower end on the pendent rock-arm, a horizontal treadle-lever held to rock on the vehicle-body, and spring-drawn means connecting said lever with the upper end of the rock-arm that is pivoted between its ends, whereby the brake is set when the treadle-lever is pressed forward and released when pressure is removed from said lever.

2. A vehicle-brake embodying a transverse brake-shaft, brake-blocks carried by the shaft for contact with the rear wheels of the vehicle, a depending rock-arm on the brake-shaft, a support extended forward from the rear axle of the vehicle, a double-ended rock-arm pivoted between its ends on said support, the lower end of said rock-arm being pivoted upon the lower end of the arm on the brake-shaft, means normally pulling the upper end of the double-ended rock-arm rearward for the release of the brake-blocks, and means adapted by foot-pressure for rocking the upper end of the double-ended rock-arm forward and thus setting the brake.

3. A vehicle-brake embodying a brake-shaft held to rock on a vehicle-body forward of the rear wheels, a depending rock-arm on the brake-shaft, a connecting-bar having an adjustable turnbuckle thereon and held at its rear end on the rear axle of the vehicle, a double-ended rock-arm pivoted between its ends on the front end of the connecting-bar, a contractile spring adapted to pull the upper end of said double-ended rock-arm rearward, a pivot connection between the lower end of the double-ended rock-arm and the lower end of the rock-arm on the brake-shaft, a horizontal treadle-lever held to rock on the vehicle-body near its front end, a link-bar connecting the treadle-lever with the upper end of the double-ended rock-arm, and means for holding the treadle-lever rocked forward against stress of the spring.

4. In a vehicle-brake of the character described, the means for setting the brake by foot-pressure, comprising the treadle-lever pivoted to rock horizontally on the bottom of the vehicle-body, a circularly-edged hub on said lever the periphery of which is formed with ratchet-teeth, a stub-shaft centrally secured in the hub and extending down through the bottom of the body, an arm on the lower end of the stub-shaft, a link-bar extended from the end of said arm rearward to the brake device, and a spring-pressed pawl adapted for engaging the ratchet-teeth and holding the brake set when the treadle-lever is rocked forward, the pawl having a lateral lug that foot-pressure will rock and release the pawl from the ratchet-teeth.

In testimony whereof I have signed my name to this specification in the presence of two subscribing witnesses.

DAVID BERRY.

Witnesses:
 LENORA E. BERRY,
 JOE H. BORDEN.